United States Patent
Feng et al.

(10) Patent No.: US 8,159,805 B2
(45) Date of Patent: Apr. 17, 2012

(54) QUICK RESPONSE MECHANISM AND METHOD FOR A SWITCHING POWER SYSTEM

(75) Inventors: Chieh-Min Feng, Zhubei (TW); Ting-Hung Wang, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 415 days.

(21) Appl. No.: 12/453,447

(22) Filed: May 12, 2009

(65) Prior Publication Data
US 2009/0284239 A1 Nov. 19, 2009

(30) Foreign Application Priority Data

May 14, 2008 (TW) ................................ 97117746 A

(51) Int. Cl.
*H02H 3/22* (2006.01)

(52) U.S. Cl. .......................................... 361/111; 361/92
(58) Field of Classification Search ............. 361/111.92
See application file for complete search history.

(56) References Cited

U.S. PATENT DOCUMENTS 6,359,796 B2 * 3/2002 Hartular et al. ................. 363/50

* cited by examiner

*Primary Examiner* — Shawn Riley
(74) *Attorney, Agent, or Firm* — Rosenberg, Klein & Lee

(57) ABSTRACT

A quick response mechanism for a switching power system includes a detector and an adjustor connected to the detector. The detector is configured to directly monitor the drop of the output voltage of the switching power system so that a quick response could be immediately triggered when a load transient occurs. The adjustor is configured to adjust the duration of the quick response, thereby preventing the output voltage from undershoot or ringback.

15 Claims, 7 Drawing Sheets

QUICK RESPONSE MECHANISM AND METHOD FOR A SWITCHING POWER SYSTEM

FIELD OF THE INVENTION

The present invention is related generally to a switching power system and, more particularly, to a quick response mechanism and method for a switching power system.

BACKGROUND OF THE INVENTION

FIG. 1 is a perspective diagram of a conventional multi-phase switching power system 10, and FIG. 2 is a typical waveform diagram of the switching power system 10. The switching power system 10 is operative to provide a regulated output voltage Vcore supplied to other electronic devices, for example a central processing unit (CPU). In the switching power system 10, an error amplifier 14 generates an error signal Vcomp, as shown by the waveform 32, according to the difference between the output voltage Vcore and a reference voltage Vref provided by a reference voltage generator 12, a ramp generator 16 provides ramp signals Vramp1 and Vramp2, as shown by the waveforms 28 and 30 respectively, a pulse width modulation (PWM) comparator 18 generates a PWM signal Vpwm1, as shown by the waveform 34, according to the error signal Vcomp and the ramp signal Vramp1, and a PWM comparator 20 generates a signal Vpwm2, as shown by the waveform 36, according to the error signal Vcomp and the ramp signal Vramp2. When the ramp signal Vramp1 is smaller than the error signal Vcomp, the PWM signal Vpwm1 is high and thus, a channel 22 is turned on to charge a capacitor C1 and thereby pump up the output voltage Vcore, as shown by the waveform 26. Likewise, when the ramp signal Vramp2 is smaller than the error signal Vcomp, the PWM signal Vpwm2 is high and in consequence, a channel 24 is turned on to charge a capacitor C2 and thereby pump up the output voltage Vcore.

However, the load current of CPU today is extremely dynamic, slewing very fast from low to high and vice versa. A CPU load current can occur within 1 µs, which is much less than the switching period of the switching power system 10. If a load transient takes place during a pulse of the PWM signal Vpwm1 or Vpwm2, for example in the interval t2 shown in FIG. 2, the falling speed of the output voltage Vcore is reduced due to the fact that the channel 22 or 24 is turned on. If a load transient occurs between pulses of the PWM signals Vpwm1 and Vpwm2, for example in the interval t1 shown in FIG. 2, the PWM controller can do nothing about it because neither Vpwm1 nor Vpwm2 is allowed to go high. So the output voltage Vcore is bound to drop out of control. Furthermore, if a load transient happens in the interval t2 while the PWM signal Vpwm1 or Vpwm2 is high, the drop of the output voltage Vcore will not be as severe as it is in the interval t1. But if the load transient is relatively large, the output voltage Vcore still significantly drops. Therefore, a quick response mechanism is needed to trigger a quick response event to turn on the channels 22 and 24 simultaneously.

To achieve optimal Vcore (no drop at all, or drop as predicted), an optimal quick response must exists. The trigger timing and the width of a quick response are both the most critical parameters of an optimal quick response. If a quick response starts too slow, the output voltage Vcore may drop out of the specification, which is known as an undershoot. On the contrary, a too fast quick response triggered before load transient occurs will induce a voltage spike. Besides, if the quick response duration is too short, the output voltage Vcore may still drop below the specification because there is no enough charge in the output capacitor pool. On the contrary, if the quick response duration is too long, the output voltage Vcore will rise high and causes a ringback. All of the above situations are desired to be prevented from.

FIG. 3 is a perspective diagram showing a conventional adaptive phase alignment (APA) for achieving quick response, in which an APA circuit 40 includes an error amplifier 42 to generate an error signal Vcomp according to the difference between the output voltage Vcore of a switching power system and a reference voltage Vref, a low-pass filter 44 to filter the error signal Vcomp to generate a signal V2, a current source 48 to provide a current Iapa flowing through a resistor Rapa to generate a voltage Vapa to offset the error signal Vcomp to generate a signal V1, and a comparator 46 to generate a quick response signal QR according to the signals V1 and V2. Thus, the APA circuit 40 works by monitoring the voltage at the APA pin and comparing it to the filtered Vcomp. The voltage at the APA pin is a copy of the error signal Vcomp with the negative offset Vapa. If the APA pin exceeds the filtered Vcomp, an APA event occurs and all channels are turned on. When a load transient occurs, the error signal Vcomp decreases, and the signal V2 falls accordingly. However, a capacitor Capa prevents the signal V1 from decreasing immediately. When the signal V2 becomes lower than the signal V1, the quick response signal QR is triggered to start a quick response. The trigger timing of the quick response signal QR is determined by the signal $$V1 = Vcomp - Iapa \times Rapa. \quad [\text{EQ-1}]$$

A user can use a larger resistor Rapa to delay the trigger timing of the APA and vice versa. However, the APA duration depends on the low-pass filter 44. The lower corner it has, the wider APA is. It's difficult for a user to control the APA width because the low-pass filter 44 is built in the controller chip.

It is well known that the error signal Vcomp provided by the error amplifier 42 will be compensated by a compensator. In other words, there will be a compensation delay between the instant when the output voltage Vcore begins to fall and the instant when the error signal Vcomp begins to fall. The goal of a good quick response is to achieve a good output voltage Vcore. The APA technique triggers the quick response by Vcomp information instead of Vcore. When a load transient event occurs at Vcore, it has to go through the compensator and then boosts Vcomp. So the APA triggers after the compensator delay. This is no good if the load transient slew rate is very high. Vcore may drop out of the specification before the APA is triggered.

Therefore, it is desired a mechanism to accurately trigger a quick response and adjust the quick response width.

SUMMARY OF THE INVENTION

An object of the present invention is to provide a quick response mechanism for a switching power system, to accurately trigger a quick response and adjust the quick response width.

Another object of the present invention is to provide a quick response method for a switching power system, to accurately trigger a quick response and adjust the quick response width.

According to the present invention, a quick response mechanism for a switching power system has a detector and an adjustor connected to the detector. The detector is configured to directly monitor the drop of the output voltage of the switching power system, and trigger a quick response signal when the drop is greater than a threshold value. The adjustor is configured to adjust the width of the quick response signal. Since the drop of the output voltage is directly detected by the detector, the quick response mechanism will offer a faster reaction to a load transient. Moreover, the adjustor determines the quick response width to prevent the output voltage from undershoot or ringback.

According to the present invention, a quick response method for a switching power system comprises directly monitoring the drop of the output voltage of the switching power system to trigger a quick response signal and adjusting the width of the quick response signal to prevent the output voltage from undershoot or ringback.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
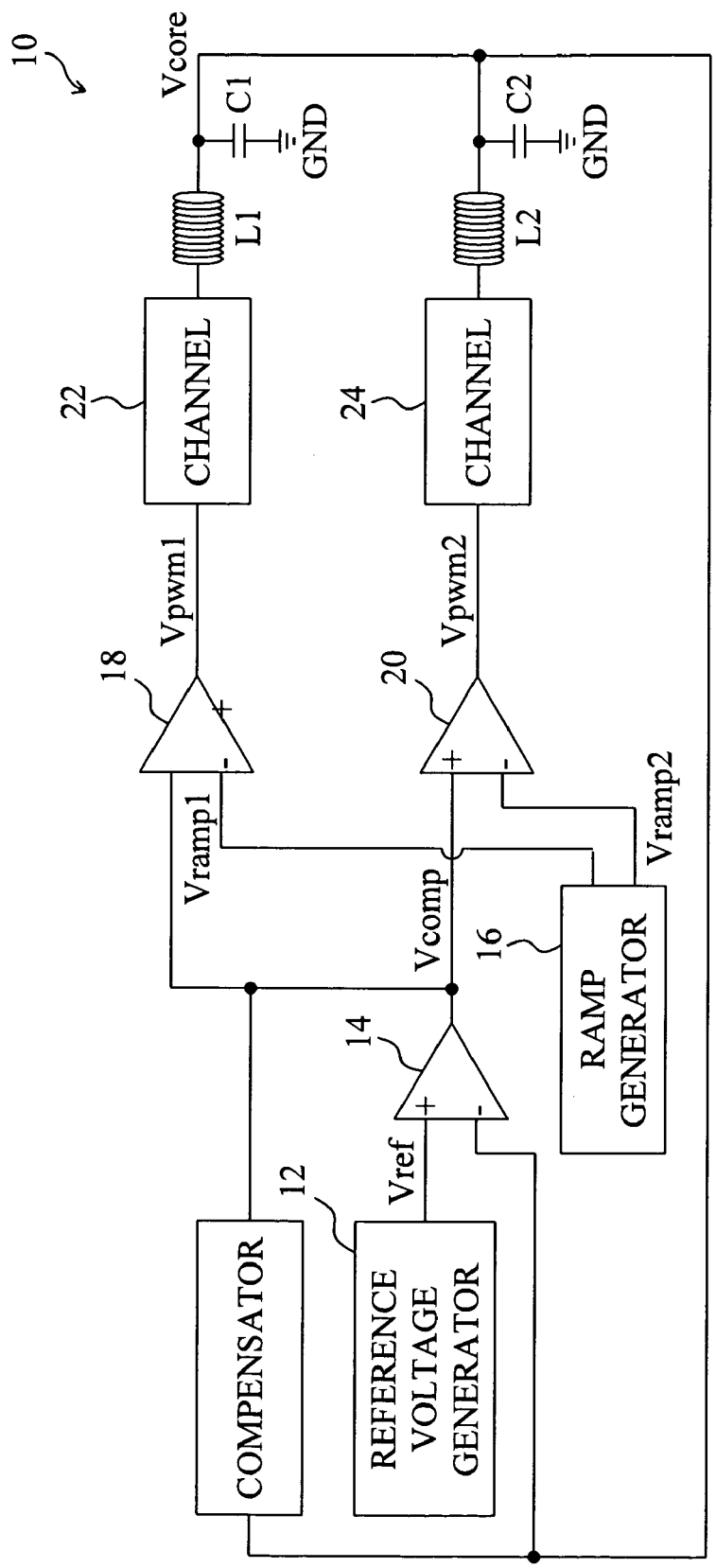
FIG. 1 is a perspective diagram of a conventional multi-phase switching power system.
Figure 2:
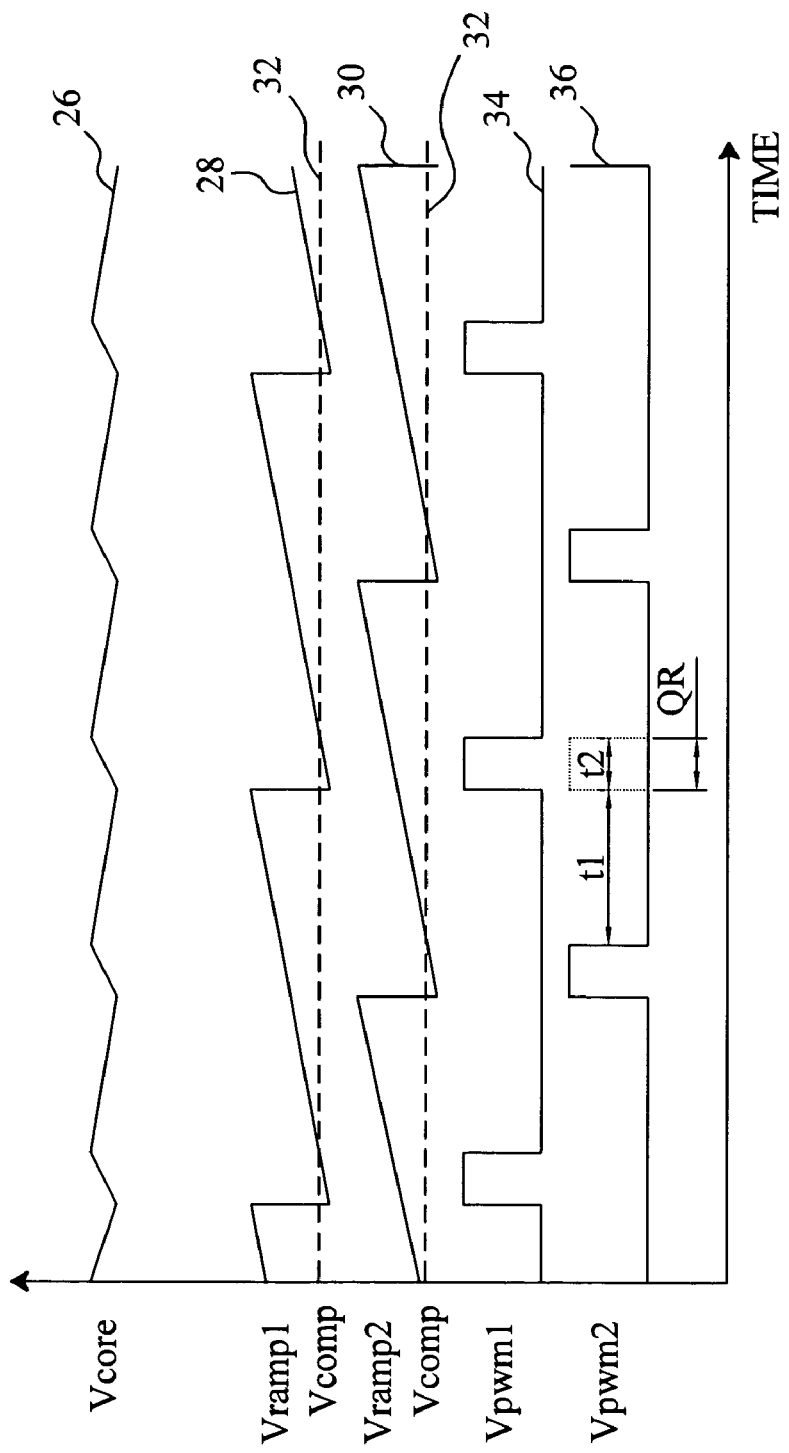
FIG. 2 is a typical waveform diagram of a conventional multi-phase switching power system.
Figure 3:
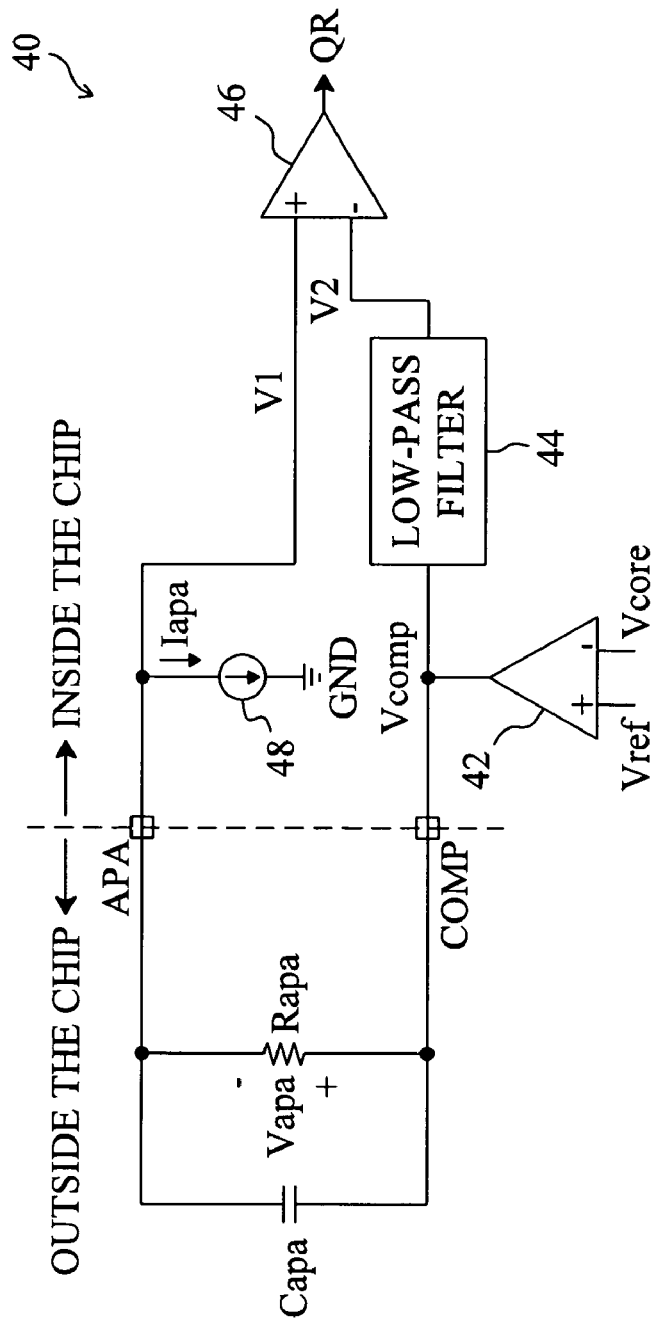
FIG. 3 is a perspective diagram showing a conventional adaptive phase alignment for achieving quick response.
Figure 4:
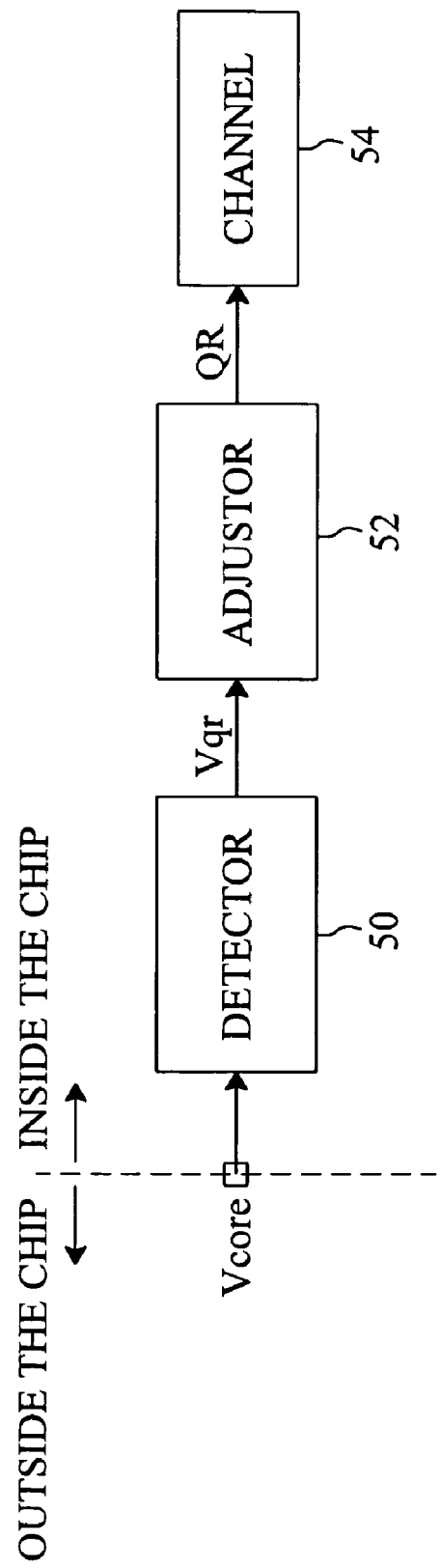
FIG. 4 is a perspective diagram of a quick response mechanism according to the present invention applied to a switching power system.
Figure 5:
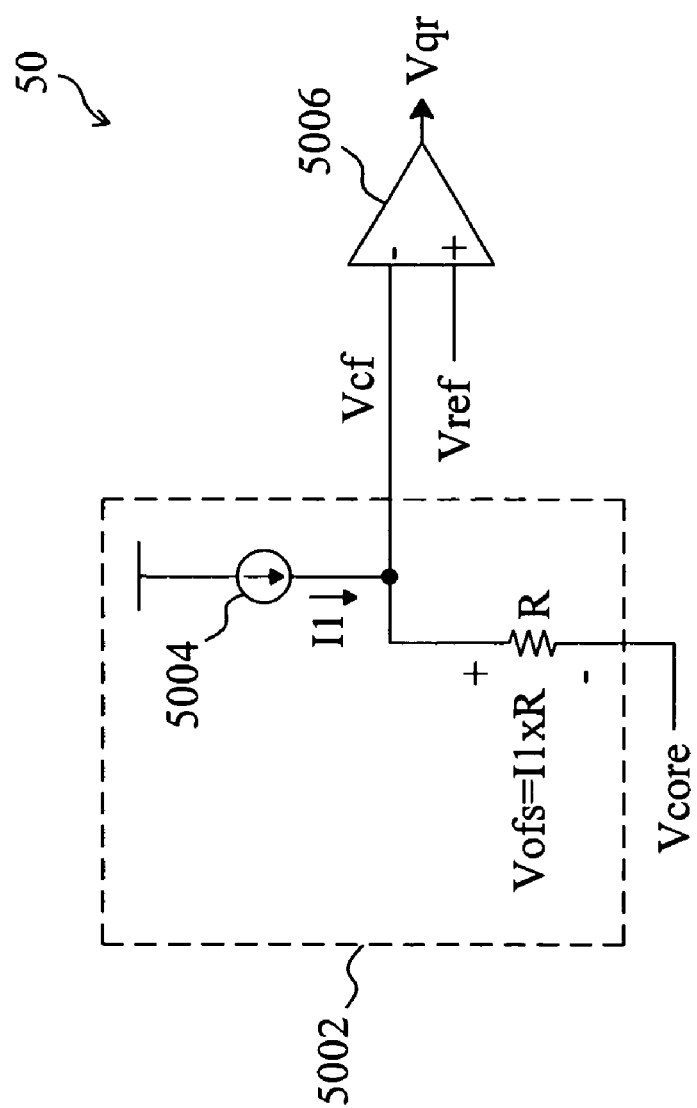
FIG. 5 is a perspective diagram of an embodiment for the detector shown in FIG. 4.

FIG. 4 is a perspective diagram of a quick response mechanism according to the present invention applied to a switching power system including a plurality of channels 54 for providing an output voltage Vcore. The quick response mechanism includes a detector 50 directly monitoring the drop of the output voltage Vcore to determine whether a load transient event occurs. When the drop of the output voltage Vcore is greater than a threshold value, the detector 50 triggers a quick response signal Vqr. An adjustor 52 is connected to the detector 50 to adjust the width of the quick response signal Vqr. A quick response signal QR is thus determined for turning on at least one of the channels 54. FIG. 5 is a perspective diagram of an embodiment for the detector 50, in which an offset circuit 5002 offsets the output voltage Vcore to generate an offsetted voltage Vcf. The offset circuit 5002 includes a current source 5004 for providing a current I1 to a resistor R to generate a voltage Vofs=I1×R. Therefore, the offsetted voltage Vcf=Vcore+Vofs. A comparator 5006 compares the offsetted voltage Vcf with a reference voltage Vref to trigger the quick response signal Vqr. In steady state, the DC level of the output voltage Vcore of the switching power system is equal to the reference voltage Vref. Assuming the voltage Vofs>0, the offsetted voltage Vcf is greater than the reference voltage Vref in steady state, and in consequence the quick response signal Vqr remains low. When a load transient takes place, the output voltage Vcore decreases. When the drop of the output voltage Vcore exceeds the voltage Vofs, the offsetted voltage Vcf becomes lower than the reference voltage Vref. As a result, the quick response signal Vqr is triggered and thereby a quick response starts. The resistor R and the current source 5004 of the offset circuit 5002 can be located outside the controller chip so that a user can change the resistance of the resistor R and the current I1, in order to adjust the voltage Vofs to determine the trigger timing of the quick response.

Figure 6:
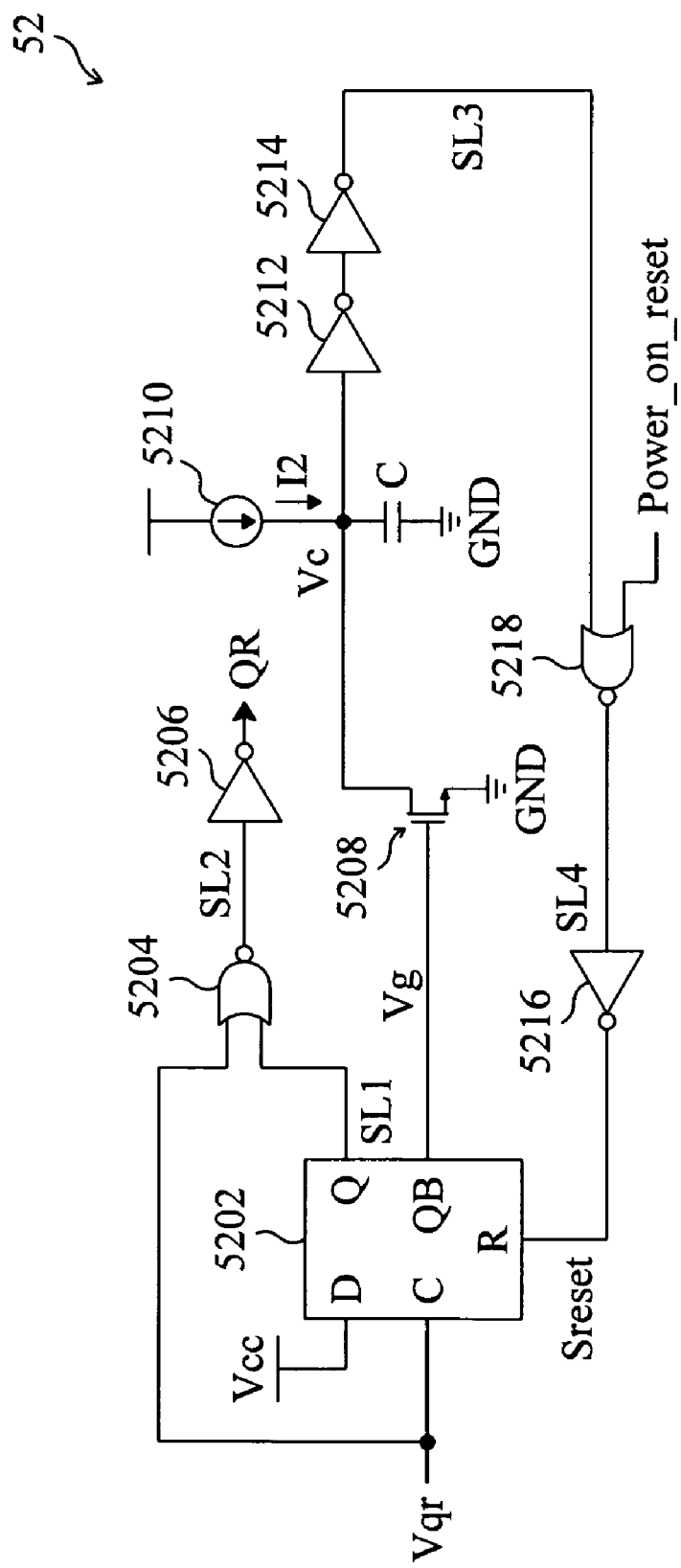
FIG. 6 is a perspective diagram of an embodiment for the adjustor shown in FIG. 4.
Figure 7:
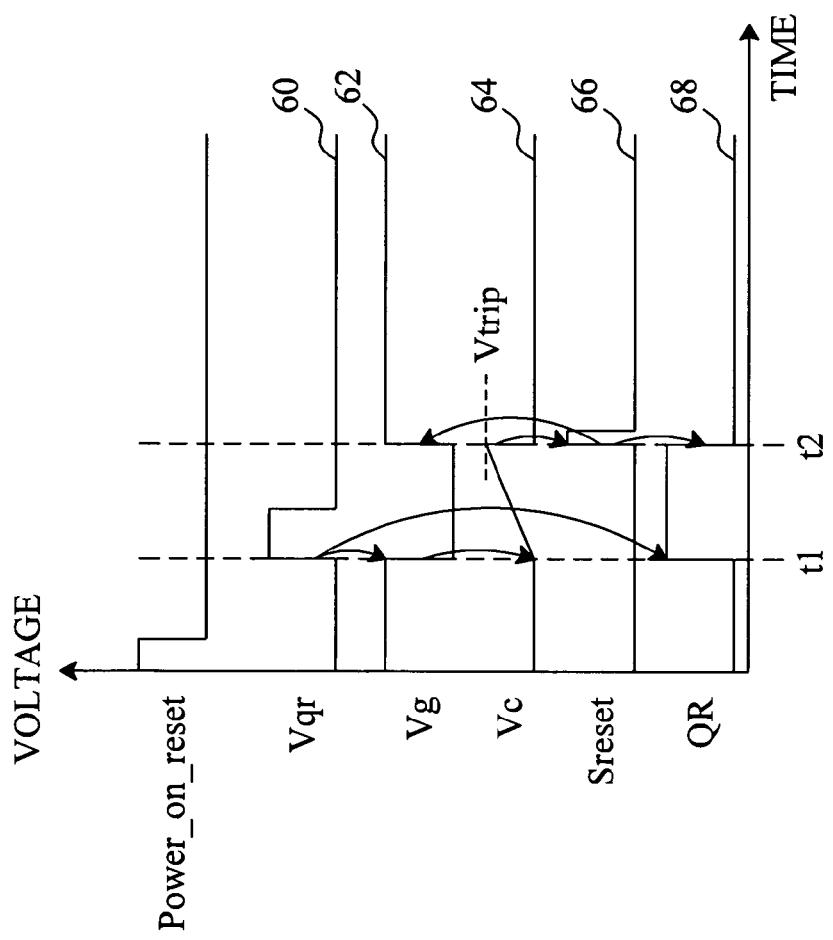
FIG. 7 is a waveform diagram when using the adjuster of FIG. 6.

The adjustor 52 can be implemented with an analog one-shot circuit, among many others. FIG. 6 is a perspective diagram of an embodiment for the adjustor 52, in which a flip-flop 5202 has a clock input C for receiving the quick response signal Vqr from the detector 50, a NOR gate 5204 generates a signal SL2 according to the quick response signal Vqr and an output signal SL1 of the flip-flop 5202, an inverter 5206 inverts the signal SL2 to generate the quick response signal QR, a switch 5208 switched by a complimentary output Vg of the flip-flop 5202 controls the charging and discharging of a capacitor C, a current source 5210 provides a current I2 for charging the capacitor C, the combination of inverters 5212 and 5214 generates a signal SL3 according to the voltage Vc of the capacitor C, a NOR gate 5218 generates a signal SL4 according to the signal SL3 and a power-on signal Power_on_reset, and an inverter 5216 inverts the signal SL4 to generate a reset signal Sreset for resetting the flip-flop 5202. FIG. 7 is a waveform diagram when using the adjuster 52 of FIG. 6, in which waveform 60 represents the quick response signal Vqr, waveform 62 represents the signal Vg, waveform 64 represents the voltage Vc, waveform 66 represents the reset signal Sreset, and waveform 68 represents the quick response signal QR. After a power-on, if the quick response signal Vqr at the input C of the flip-flop 5202 transits to high, as shown by the waveform 60 at time t1, the quick response signal QR will turn on, as shown by the waveform 68, so as to trigger a quick response. Meanwhile, the signal Vg will transit to low, as shown by the waveform 62, so as to turn off the switch 5208. As a result, the voltage Vc of the capacitor C starts to rise up, as shown by the waveform 64. During the voltage Vc is increasing, the signal SL1 remains at high and in consequence the quick response signal QR also remains at high. When the voltage Vc reaches a threshold value Vtrip preset in the inverter 5212, as indicated at time t2, the inverter 5212 sends out a low-level signal so that the reset signal Sreset transits to high, as shown by the waveform 66, and thereby resets the flip-flop 5202. Consequently, the signal SL1 transits to low, which also turns off the quick response signal QR and thus ends the quick response. At the same time, the signal Vg transits to high to turn on the switch 5208 and thereby discharge the capacitor C. From FIGS. 6 and 7, the quick response signal QR has a width $$\Delta t = (C \times V\text{trip})/I2. \quad [\text{EQ-2}]$$

According to the equation EQ-2, the width $\Delta t$ of the quick response signal QR can be adjusted by changing the capacitance of the capacitor C, the current I2 and the threshold value Vtrip. Therefore, it is easy for a user to adjust the quick response duration by changing at least one of the capacitance of the capacitor C, the current I2 and the threshold value Vtrip externally.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A quick response mechanism for a switching power system, comprising:

a detector connected to an output of the switching power system to directly monitor a drop of an output voltage of the switching power system to trigger a quick response signal; and an adjustor connected to the detector to adjust a width of the quick response signal.

2. The quick response mechanism of claim 1, wherein the detector comprises:

an offset circuit connected to the output of the switching power system to offset the output voltage to generate an offsetted voltage; and a comparator connected to the offset circuit to compare the offsetted voltage with a reference voltage to trigger the quick response signal when the offsetted voltage is lower than the reference voltage.

3. The quick response mechanism of claim 2, wherein the reference voltage is equal to a DC level of the output voltage in steady state.

4. A quick response mechanism for a switching power system, comprising:

a detector connected to an output of the switching power system to directly monitor a drop of an output voltage of the switching power system to trigger a quick response signal; and an adjustor connected to the detector to adjust a width of the quick response signal;

wherein the adjustor comprises:

a capacitor; and a current source connected to the capacitor to charge the capacitor when the quick response signal is asserted;

wherein the quick response signal is ended when the voltage of the capacitor reaches a threshold value.

5. The quick response mechanism of claim 4, wherein the capacitor is a variable capacitor.

6. The quick response mechanism of claim 4, wherein the current source is a variable current source.

7. The quick response mechanism of claim 4, wherein the threshold value is variable.

8. The quick response mechanism of claim 4, further comprising a flip-flop connected to the capacitor to provide a logical signal, wherein the logical signal switches from a first logic state to a second logic state when the quick response signal is triggered, and switches from the second logic state to the first logic state when the voltage of the capacitor reaches the threshold value.

9. A quick response method for a switching power system, comprising:

(A) directly monitoring a drop of an output voltage of the switching power system to trigger a quick response signal; and (B) determining a width of the quick response signal.

10. The quick response method of claim 9, wherein the step A comprises:

offsetting the output voltage to generate an offsetted voltage; and comparing the offsetted voltage with a reference voltage to trigger the quick response signal when the offsetted voltage becomes lower than the reference voltage.

11. The quick response method of claim 10, wherein the reference voltage is equal to a DC level of the output voltage in steady state.

12. The quick response method of claim 9, wherein the step B comprises:

providing a current for charging a capacitor when the quick response signal is asserted; and turning off the quick response signal when the voltage of the capacitor is greater than a threshold value.

13. The quick response method of claim 12, wherein the current is adjustable to adjust the width of the quick response signal.

14. The quick response method of claim 12, wherein the capacitor has an adjustable capacitance to adjust the width of the quick response signal.

15. The quick response method of claim 12, wherein the threshold value is adjustable to adjust the width of the quick response signal.

* * * * *